United States Patent
Hinckley et al.

(10) Patent No.: US 10,198,109 B2
(45) Date of Patent: Feb. 5, 2019

(54) SUPPLEMENTING A TOUCH INPUT MECHANISM WITH FINGERPRINT DETECTION

(71) Applicant: MICROSOFT TECHNOLOGY LICENSING, LLC, Redmond, WA (US)

(72) Inventors: Kenneth P. Hinckley, Redmond, WA (US); Michel Pahud, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/948,388

(22) Filed: Nov. 23, 2015

(65) Prior Publication Data
US 2016/0283021 A1 Sep. 29, 2016

Related U.S. Application Data

(63) Continuation of application No. 12/970,955, filed on Dec. 17, 2010, now Pat. No. 9,201,539.

(51) Int. Cl.
*G09G 5/00* (2006.01)
*G06F 3/041* (2006.01)
*G06K 9/00* (2006.01)

(52) U.S. Cl.
CPC ....... *G06F 3/0416* (2013.01); *G06K 9/00013* (2013.01); *G06K 9/00067* (2013.01)

(58) Field of Classification Search
CPC ...... G06F 3/03547; G06F 3/044; G06F 3/042; G06F 3/0421; G06F 3/0416; G06K 9/00013; G06K 9/00067

(Continued)

(56) References Cited

U.S. PATENT DOCUMENTS 6,603,462 B2 * 8/2003 Matusis ................ G06F 3/0233
340/5.83
7,242,389 B1 * 7/2007 Stern ..................... G06Q 10/10
345/158

(Continued)

OTHER PUBLICATIONS

"Palm Print Recognition", In Proceedings of NSTC Subcommittee on Biometrics, Retrieved from <<https://web.archive.org/web/20060630210109/http://www.biometricscatalog.org/NSTCSubcommittee/Documents/Palm%20Print%20Recognition.pdf>>, Mar. 27, 2006, 10 Pages.

(Continued)

*Primary Examiner* — Jennifer T Nguyen
(74) *Attorney, Agent, or Firm* — Ranjeev Singh; Singh Law, PLLC (57) ABSTRACT

A device and related methods, including a display and a display surface, are provided. The device includes logic configured to detect touch events received via the display surface. The display is coupled to a remote computing functionality that is configured to store shared work space information in a data store associated with the remote computing functionality to support collaborative tasks performed by participants in an interaction session. The device further includes logic configured to receive touch events and interpret the touch events as a request to drag an object, select a menu option, or display a web page. The device further includes logic configured to receive requests, not via the display surface of the display, but from user devices different from the display. Such requests can include requests to display an object on the display surface or execute an application.

16 Claims, 10 Drawing Sheets

(58) Field of Classification Search
USPC .................................................. 345/173–178
See application file for complete search history.

(56) References Cited

U.S. PATENT DOCUMENTS

| | | | |
|---|---|---|---|
| 7,362,221 B2 | 4/2008 | Katz | |
| 7,697,729 B2 | 4/2010 | Howell et al. | |
| 8,125,459 B2* | 2/2012 | Mattice | G06F 3/0436 |
| | | | 178/18.01 |
| 8,161,530 B2 | 4/2012 | Meehan et al. | |
| 9,201,539 B2* | 12/2015 | Hinckley | G06F 3/0416 |
| 2001/0031075 A1 | 10/2001 | Fujii | |
| 2003/0048260 A1 | 3/2003 | Matusis | |
| 2005/0162402 A1 | 7/2005 | Watanachote | |
| 2005/0259851 A1 | 11/2005 | Fyke | |
| 2006/0274046 A1* | 12/2006 | Hillis | G06F 3/04883 |
| | | | 345/173 |
| 2007/0097096 A1 | 5/2007 | Rosenberg | |
| 2007/0097151 A1 | 5/2007 | Rosenberg | |
| 2008/0036743 A1 | 2/2008 | Westerman et al. | |
| 2009/0095540 A1 | 4/2009 | Zachut et al. | |
| 2009/0109180 A1* | 4/2009 | Do | G06F 3/0416 |
| | | | 345/173 |
| 2009/0169070 A1 | 7/2009 | Fadell | |
| 2009/0174679 A1 | 7/2009 | Westerman | |
| 2009/0244031 A1 | 10/2009 | Westerman et al. | |
| 2010/0117963 A1 | 5/2010 | Westerman et al. | |
| 2010/0240415 A1* | 9/2010 | Kim | G06F 3/03547 |
| | | | 455/565 |
| 2011/0021251 A1 | 1/2011 | Linden | |
| 2011/0286686 A1* | 11/2011 | Kwon | G06K 9/00026 |
| | | | 382/294 |
| 2012/0154293 A1 | 6/2012 | Hinckley et al. | |
| 2012/0154294 A1 | 6/2012 | Hinckley et al. | |
| 2012/0154295 A1 | 6/2012 | Hinckley et al. | |
| 2012/0158629 A1 | 6/2012 | Hinckley et al. | |

OTHER PUBLICATIONS

"Non-final Office Action Issued in U.S. Appl. No. 12/970,955", Dated: Jun. 20, 2013, 10 Pages.

"Non-final Office Action Issued in U.S. Appl. No. 12/970,955", Dated: Jan. 13, 2014, 12 Pages.

"Non-final Office Action Issued in U.S. Appl. No. 12/970,955", Dated: Oct. 9, 2014, 10 Pages.

"Notice of Allowance Issued in U.S. Appl. No. 12/970,955", Dated: Jul. 24, 2015, 9 Pages.

Marshall, et al., "Pressing the Flesh: Sensing Multiple Touch and Finger Pressure on Arbitrary Surfaces", In Proceedings of the 6th International Conference on Pervasive Computing, May 19, 2008, 18 Pages.

Response filed Sep. 20, 2013 in U.S. Appl. No. 12/970,955, 13 Pages.

Response filed Jun. 13, 2014 in U.S. Appl. No. 12/970,955, 18 Pages.

Response filed Apr. 9, 2015 in U.S. Appl. No. 12/970,955, 25 Pages.

* cited by examiner

SUPPLEMENTING A TOUCH INPUT MECHANISM WITH FINGERPRINT DETECTION

CROSS-REFERENCE TO RELATED APPLICATION

This application is a continuation of, and claims benefit from, commonly assigned, co-pending U.S. patent application Ser. No. 12/970,955, with inventors Kenneth P. Hinckley et al., filed Dec. 17, 2010, entitled "Supplementing a Touch Input Mechanism with Fingerprint Detection," which is hereby incorporated by reference herein in its entirety.

BACKGROUND

Touch input mechanisms have one or more drawbacks. For example, it may be difficult for a user to interact with a display surface of a touch input mechanism without causing inadvertent input events. In one scenario, for example, the user may attempt to perform a task using the computing device that does not involve the touch input mechanism. Yet the user may handle the computing device in a manner which causes inadvertent contact with the display surface. Or the user may accidently brush or bump against the display surface. The touch input mechanism may incorrectly interpret these inadvertent contacts as legitimate input events. In another scenario, the touch input mechanism may accommodate two or more distinct gestures that are nonetheless similar. In this case, the user may intend to enter a particular gesture, but the computing device may mistakenly interpret that gesture as another, similar, gesture. These problems may understandably frustrate the user if they become a frequent occurrence, or, even if uncommon, if they cause significant disruption in the task that the user is performing.

Moreover, a designer may wish to provide an expressive touch input mechanism that accommodates a rich set of input gestures. However, increasing the number of valid gestures may increase the risk of inadvertent input events. This design goal may therefore complicate the above-noted challenges. Further, increasing the number and/or complexity of gestures may make it more difficult for users to understand and memorize the gestures.

SUMMARY

A computing device includes at least a touch input mechanism for providing one or more touch input events that indicate contact of a hand with a display surface of a display mechanism or other part of the computing device. The computing device also includes a fingerprint detection module for detecting any fingerprint information that may be present in the touch input event(s).

The computing device can leverage the fingerprint information in at least one of two ways (or both ways). In a first approach, the computing device can use the fingerprint information to provide an enhanced interpretation of the touch input event(s) provided by the touch input mechanism. For example, the computing device can use the presence (or absence) of the fingerprint information to identify unintended input actions. For example, the computing device can interpret the absence of fingerprint information as a possibility that the user may have inadvertently brushed the display surface with a palm or a knuckle, etc. In another case, the computing device can use the fingerprint information to determine which finger of the hand has contacted the display surface, which, in turn, can be used to provide a more nuanced interpretation of the touch input event(s).

In a second application, the computing device can use the fingerprint information to identify an individual associated with the fingerprint information. The computing device can then provide a user experience via the display mechanism that corresponds to the individual's identity. For example, the computing device can display content on the display surface (such as a menu, document, etc.) that is associated with the individual.

Overall, the use of fingerprint information can reduce the risk that the computing device will misinterpret input actions performed by the user. Further, the use of fingerprint information enables a designer to provide rich and expressive gestures, which are nevertheless not overly complex. These features may contribute to providing a satisfactory user experience.

A device and related methods, including a display and a display surface, are also provided. The device includes logic configured to detect touch events received via the display surface. The display is coupled to a remote computing functionality that is configured to store shared work space information in a data store associated with the remote computing functionality to support collaborative tasks performed by participants in an interaction session. The device further includes logic configured to receive touch events and interpret the touch events as a request to drag an object, select a menu option, or display a web page. The device further includes logic configured to receive requests, not via the display surface of the display, but from user devices different from the display. Such requests can include requests to display an object on the display surface or execute an application. The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing device that includes functionality for detecting and utilizing fingerprint information. Section B describes illustrative methods which explain the operation of the computing device of Section A. Section C describes illustrative processing functionality that can be used to implement any aspect of the features described in Sections A and B.

Figure 14:
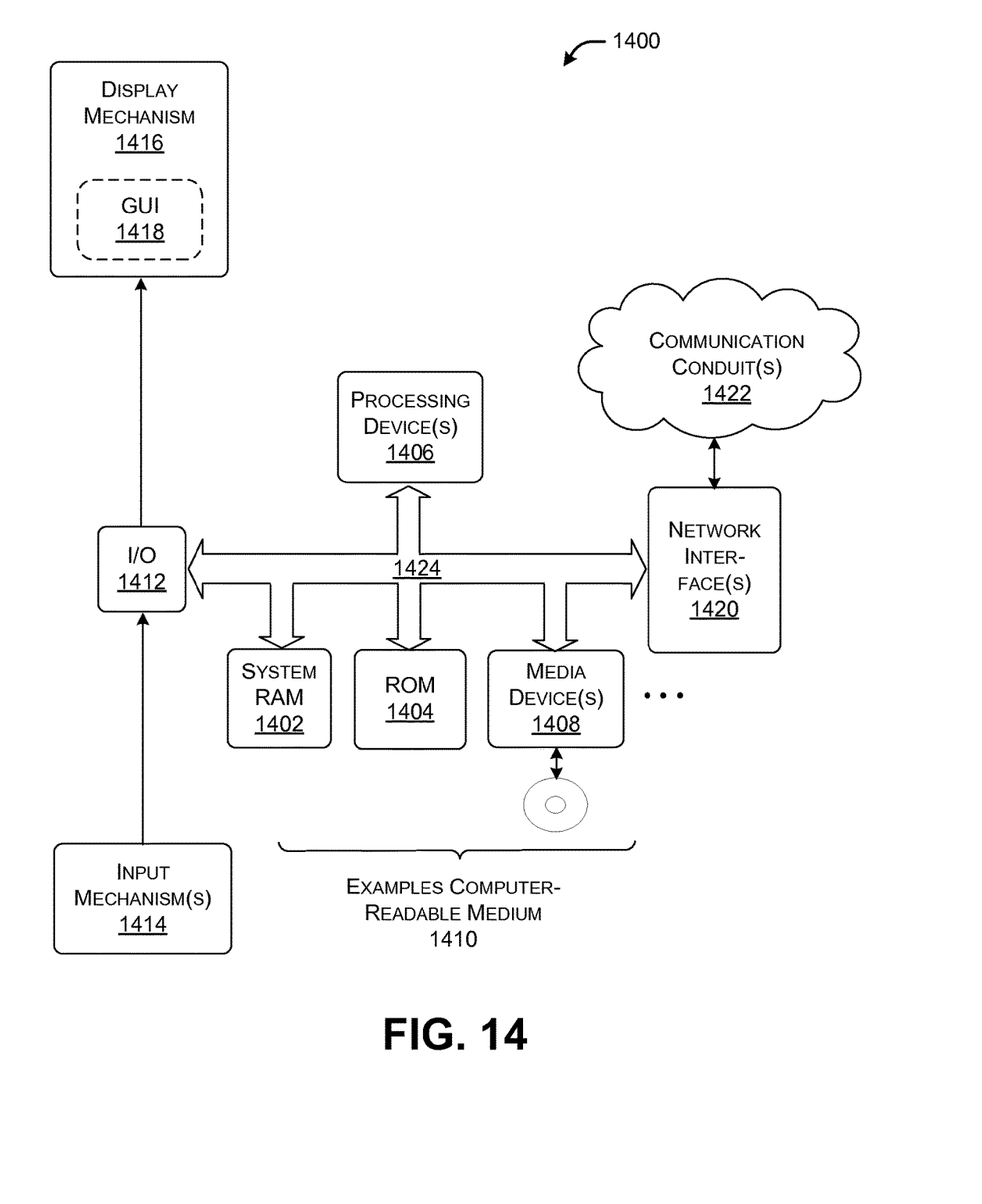
FIG. 14 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (such as by hardware, software, firmware, etc., or any combination thereof). In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 14, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (such as by hardware, software, firmware, etc., or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Computing Devices

A.1. Overview

Figure 1:
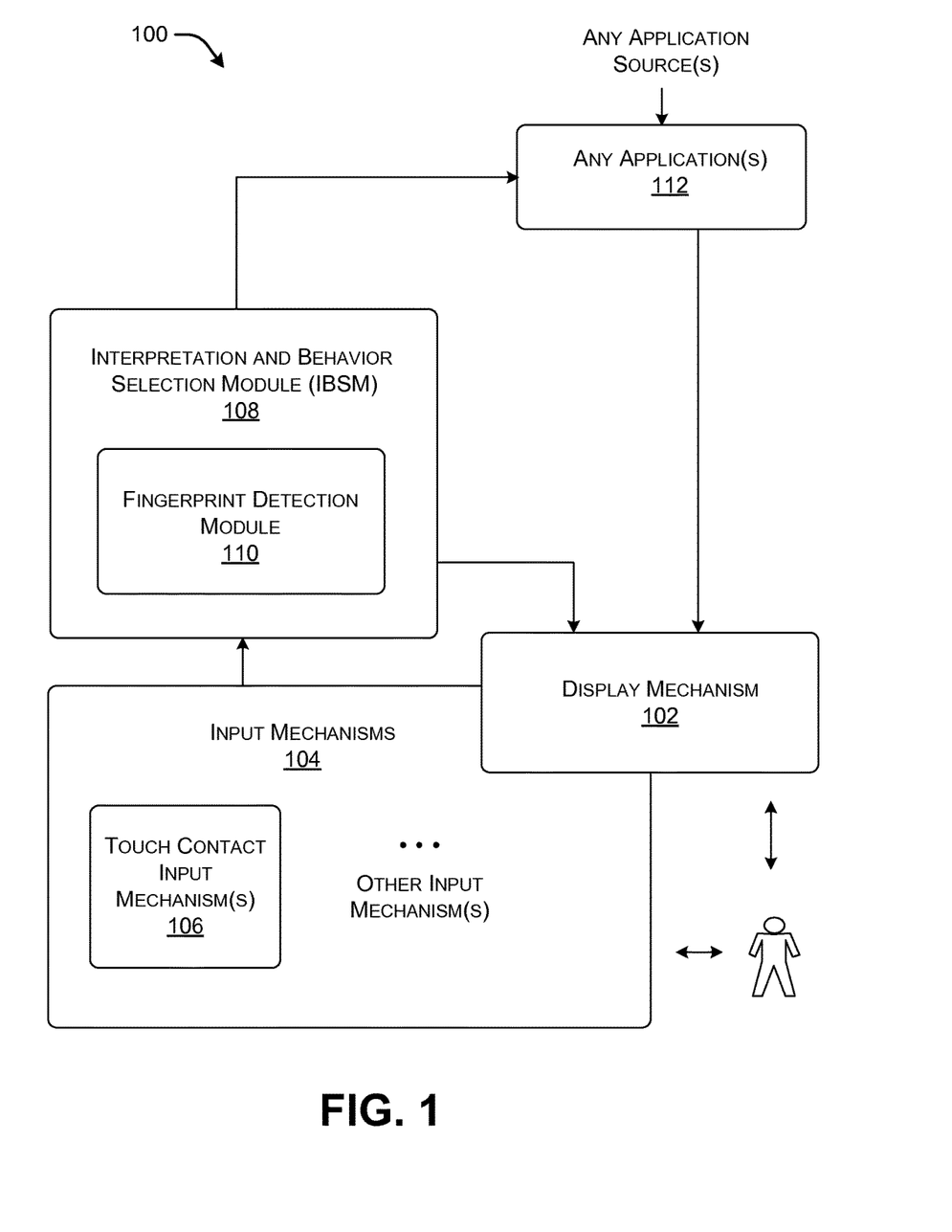
FIG. 1 shows an illustrative computing device that includes functionality for detecting fingerprint information.

FIG. 1 shows an example of a computing device 100 that can detect and utilize fingerprint information. The computing device 100 may optionally include a display mechanism 102 in conjunction with various input mechanisms 104. The display mechanism 102 provides a visual rendering of digital information on a display surface. The display mechanism 102 can be implemented by any type of display, such as a liquid crystal display, etc. Although not shown, the computing device 100 can also include an audio output mechanism, a haptic (e.g., vibratory) output mechanism, etc.

The plural input mechanisms 104 allow a user to enter commands and other information to the computing device 100. For example, the input mechanisms 104 can include one or more touch input mechanisms 106, referred to in the singular below for brevity. Although not specifically enumerated in FIG. 1, other input mechanisms can include a pen input mechanism, a keypad input mechanism, a mouse input mechanism, a voice input mechanism, and so on. The computing device 100 can also include various supplemental input mechanisms, such as an accelerometer, a gyro device, a video camera, a depth sensing mechanism, a stereo sensing input mechanism, and so on.

The touch input mechanism 106 can be implemented using any technology, such as a resistive touch screen technology, capacitive touch screen technology, acoustic touch screen technology, bi-directional touch screen technology, and so on. In bi-direction touch screen technology, a display mechanism provides elements devoted to displaying information and elements devoted to receiving information. Thus, a surface of a bi-directional display mechanism also serves as a capture mechanism. The touch input mechanism 106 can also be implemented using a pad-type input mechanism that is separate from (or at least partially separate from) the display mechanism 102. A pad-type input mechanism is also referred to as a tablet, a digitizer, a graphics pad, etc.

FIG. 1 depicts the input mechanisms 104 as partially overlapping the display mechanism 102. This is because at least some of the input mechanisms 104 may be integrated with functionality associated with the display mechanism 102. This is the case with respect to the touch input mechanism 106. Namely, the touch input mechanism 106 relies, in part, on functionality provided by the display mechanism 102. Note that many of the examples set forth herein are framed in the context of a touch-sensitive display, but any of the examples can alternatively, or in addition, be implemented using a pad-type input mechanism, even though not expressly mentioned in each instance. Further, "touch" is to be liberally construed as used herein. In one case, a user touches a surface by making physical contact with the surface. In another case, a user touches a surface by bringing a finger (or fingers) in proximity to the surface, but not in physical contact; in that case, for example, an image sensing mechanism or the like can receive input events which capture the user's fingerprint.

In the terminology used herein, each input mechanism is said to generate an input event when it is invoked by the user. For example, when a user touches the display surface of the display mechanism 102, the touch input mechanism 106 generates touch input events. An action made by the user using any input modality is referred to as a gesture or an input action. Any gesture may include two or more component gestures, corresponding to individual input actions which make up the encompassing gesture. For ease and brevity of reference, the following explanation will most often describe the output of an input mechanism in the plural, e.g., as "input events." However, various analyses can also be performed on the basis of a singular input event.

An interpretation and behavior selection module (IBSM) 108 receives input events from the input mechanisms 104. As the name suggests, the IBSM 108 performs the task of interpreting the input events, e.g., to detect a gesture that a user has made using any input mechanism. After reaching an interpretation of the input events, the IBSM 108 performs appropriate behavior associated with that interpretation.

The IBSM 108 includes a fingerprint detection module 110. The fingerprint detection module 110 can receive touch input events from one or more of the input mechanisms 104. The fingerprint detection module 110 can then examine the touch input events to determine if they contain fingerprint information. If so, the fingerprint detection module 110 can extract the fingerprint information from the touch input events. After detection, the IBSM 108 can apply the fingerprint information in various ways, described below.

As used herein, an instance of fingerprint information may correspond to a pattern exhibited by a user's fingertip. In one case, the IBSM 108 determines that fingerprint information is present in input events that have been received; further, the IBSM 108 can determine that the fingerprint information can be associated with a particular person (and a particular finger of that person). In a second case, the IBSM 108 determines that the input events appear to reveal fingerprint information, but the fingerprint information cannot be associated with a particular person (e.g., because that fingerprint information may not have been previously encountered and stored). In a third case, the IBSM 108 determines that the input events do not correspond to any fingerprint information, and hence represent non-fingerprint information according to the terminology used herein. Nevertheless, some portions of the hand exhibit print information. Hence, the non-fingerprint information may nonetheless reveal some kind of characteristics print information which can assist the IBSM 108 in interpreting an input action. As used herein, the term hand portion refers to any part (or parts) of the hand.

In one case, the fingerprint detection module 110 can receive touch input events from the same input mechanism that the computing device 100 uses to capture normal gestures and the like. Alternatively, or in addition, the fingerprint detection module 110 can receive touch input events from another input mechanism that is specialized to discriminate the detail typically found in fingerprint information. Generally, the fingerprint detection module 110 can rely on any technology for capturing an image of a fingerprint, including optical, capacitive, ultrasonic, etc. technologies, or some combination thereof.

Finally, the computing device 100 may run one or more applications 112 received from any application source or sources. The applications 112 can provide any higher-level functionality in any application domain. Further, the applications 112 can leverage the functionality of the IBSM 108 in various ways, e.g., by creating new uses for the fingerprint information.

In one case, the IBSM 108 represents a separate component with respect to the applications 112. In another case, one or more functions attributed to the IBSM 108 can be performed by one or more applications 112. Accordingly, the concept of the IBSM 108 is to be interpreted liberally herein as encompassing functions that can be performed by any number of components within a particular implementation.

Figure 2:
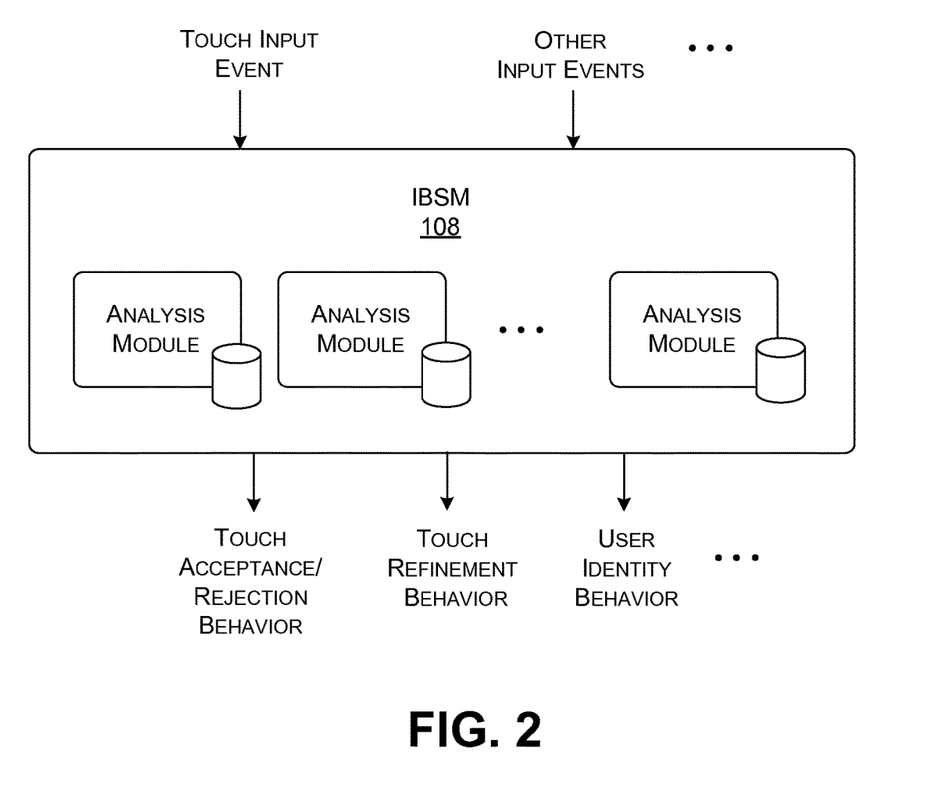
FIG. 2 shows an interpretation and behavior selection module (IBSM) used in the computing device of FIG. 1.

FIG. 2 shows another depiction of the IBSM 108 introduced in FIG. 1. As shown in FIG. 2, the IBSM 108 receives various input events and provides various output behaviors. For example, the IBSM 108 receives touch events from the touch input mechanism 106, as well as any other input events from any other input mechanisms. In response to these events, the IBSM 108 provides various types of behavior. In one behavior, the IBSM 108 uses fingerprint information to reject inadvertent touch contacts, e.g., associated with a palm, knuckle, pinky finger, etc. In another behavior, the IBSM 108 uses the fingerprint information to refine its interpretation of touch input events, but without outright rejecting the touch input events. In another behavior, the IBSM 108 uses the fingerprint information to identify the individual associated with the fingerprint information; the IBSM 108 then provides an appropriate customized user experience to that individual.

To function as described, the IBSM 108 can incorporate a suite of analysis modules, where the detection of different input scenarios may rely on different respective analysis modules. Any analysis module can rely on one or more techniques to classify the input events, including pattern-matching techniques, rules-based techniques, statistical techniques, and so on. For example, to classify a particular sequence of input events, a particular analysis module can compare those input events against a data store of known patterns. Further, an analysis module can continually test its conclusions with respect to new input events that arrive.

Figure 3:
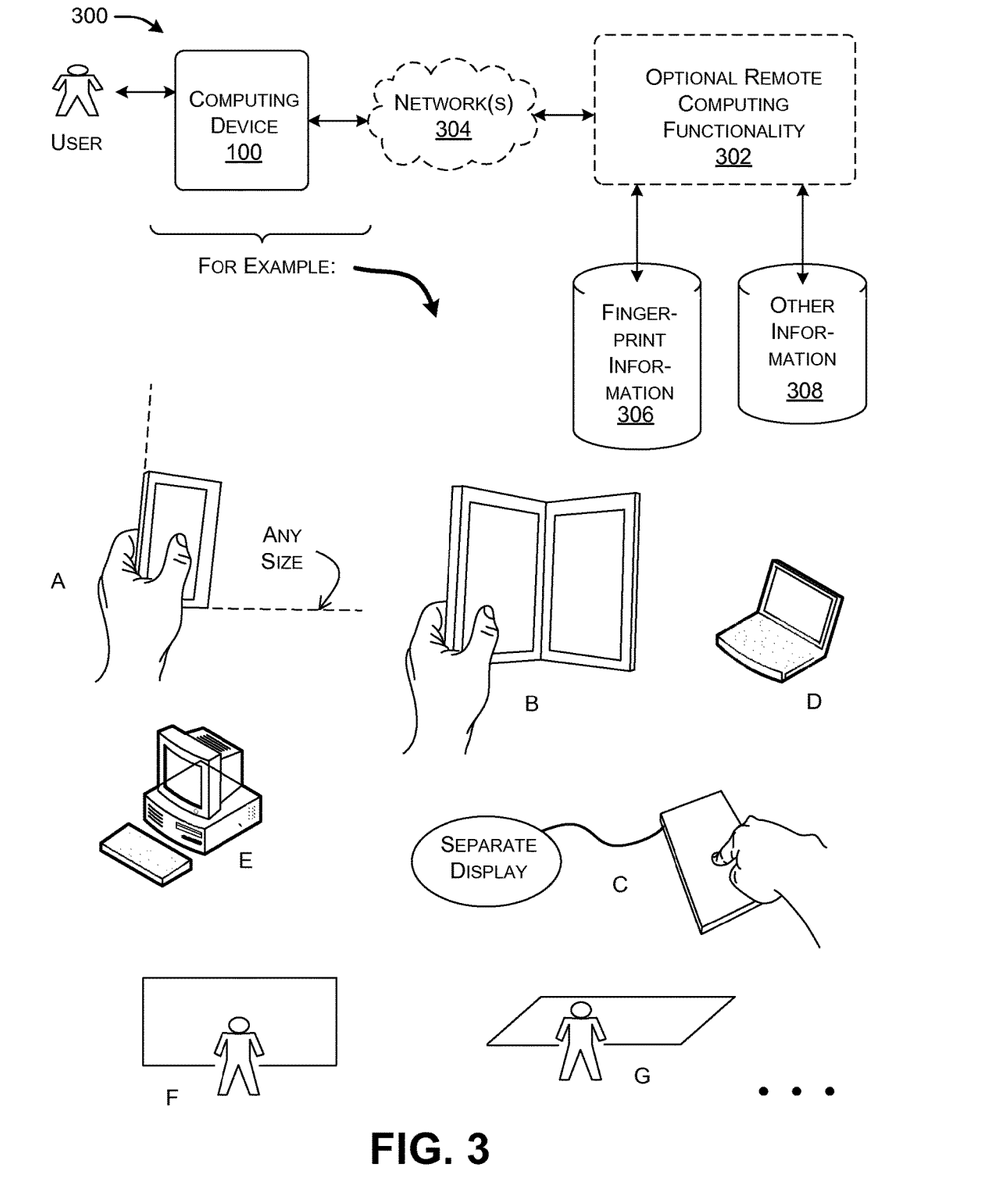
FIG. 3 shows an illustrative system in which the computing device of FIG. 1 can be used.

FIG. 3 shows an illustrative system 300 in which the computing device 100 of FIG. 1 can be used. In this system 300, a user interacts with the computing device 100 to provide input events and receive output information. The computing device 100 can be physically implemented as any type of device, including any type of handheld device as well as any type of traditionally stationary device. For example, the computing device 100 can be implemented as a personal digital assistant, a mobile communication device, a pad-type device, a book reader device, a handheld game device, a laptop computing device, a personal computer device, a work station device, a game console device, a set-top box device, and so on. Further, the computing device 100 can include one or more device parts, some of which may have corresponding display surface parts.

FIG. 3 depicts a representative (but non-exhaustive) collection of implementations of the computing device 100. In scenario A, the computing device 100 is a handled device having any size. In scenario B, the computing device 100 is a book-reader device having multiple device parts. In scenario C, the computing device 100 includes a pad-type input device, e.g., whereby a user makes touch and/or pen gestures on the surface of the pad-type input device rather than (or in addition to) the display surface of the display mechanism 102. The pad-type input device can be integrated with the display mechanism 102 or separate therefrom (or some combination thereof). In scenario D, the computing device 100 is a laptop computer having any size. In scenario E, the computing device 100 is a personal computer of any type. In scenario F, the computing device 100 is associated with a wall-type display mechanism. In scenario G, the computing device 100 is associated with a tabletop display mechanism, and so on. In a collaborative environment, a display surface may represent a virtual distributed display space (e.g., in which all of the participants may not be present together at a single centralized site).

In one scenario, the computing device 100 can act in a local mode, without interacting with any other functionality. Alternatively, or in addition, the computing device 100 can interact with any type of remote computing functionality 302 via any type of network 304 (or networks). For instance, the remote computing functionality 302 can provide applications that can be executed by the computing device 100. In one case, the computing device 100 can download the applications; in another case, the computing device 100 can utilize the applications via a web interface or the like. The remote computing functionality 302 can also implement any aspect or aspects of the IBSM 108, including functionality associated with the fingerprint detection module 110. Accordingly, in any implementation, one or more functions said to be components of the computing device 100 can be implemented by the remote computing functionality 302.

In another case, the remote computing functionality 302 can store fingerprint information in a data store 306. This fingerprint information identifies the fingerprints associated with different users. In this implementation, upon detecting fingerprint information, the fingerprint detection module 110 can consult the remote computing functionality 302 to map the detected fingerprint information to a corresponding individual. The remote computing functionality 302 can also store user documents and other information in a data store 308. In addition, or alternatively, the data store 308 can store shared workspace information to support collaborative tasks performed by participants of interaction sessions.

The remote computing functionality 302 can be implemented using one or more server computers, data stores, routing equipment, and so on. The network 304 can be implemented by any type of local area network, wide area network (e.g., the Internet), or combination thereof. The network 304 can be physically implemented by any combination of wireless links, hardwired links, name servers, gateways, etc., governed by any protocol or combination of protocols.

Figure 4:
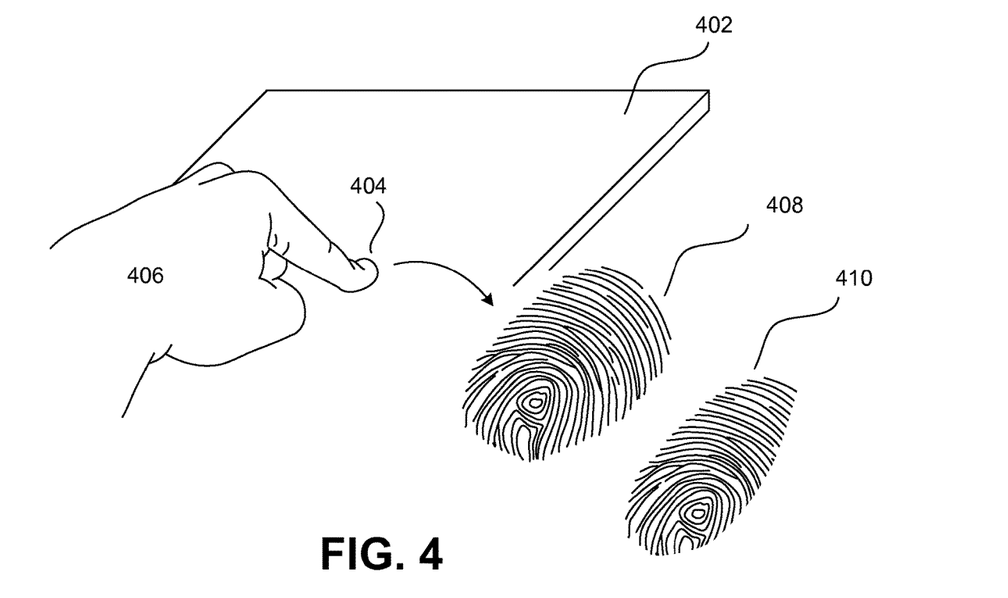
FIG. 4 provides a high-level depiction of the capture of fingerprint information based on touch input events provided by a touch input mechanism.

A.2. Use of Fingerprint Information to Enhance Interpretation of Touch Input Events According to a first use, the IBSM 108 can use the fingerprint information to enhance interpretation of touch input events. FIG. 4 serves as a vehicle for introducing this concept. Namely, FIG. 4 shows one way in which a user may contact a display surface 402 (or digitizing pad, etc.) of the computing device 100 by pressing a finger 404 of a hand 406 against the display surface 402. For example, the user may press the finger 404 to select an object or menu option presented on the display surface 402. The touch input mechanism 106 can detect this input action and generate touch input events in response thereto. The IBSM 108 receives the touch input events and interprets them.

The fingerprint detection module 110 facilitates the analysis of the touch input events by the IBSM 108. In this role, the fingerprint detection module 110 can encounter different scenarios. In a first scenario, the IBSM 108 determines that the touch input events contains fingerprint information. The IBSM 108 can furthermore determine that the fingerprint information is "clean" and well defined. FIG. 4 shows an example of well-defined fingerprint information 408. Further, the IBSM 108 can conclude that the fingerprint is associated with a finger that is typically used to interact with the display surface 402, as opposed to, for example, a pinky finger. Based on all of these contributing factors, the IBSM 108 can conclude that the user has likely executed an intentional input action. The IBSM 108 can then proceed to carry out whatever gesture or other behavior is associated with the touch input events.

Figure 5:
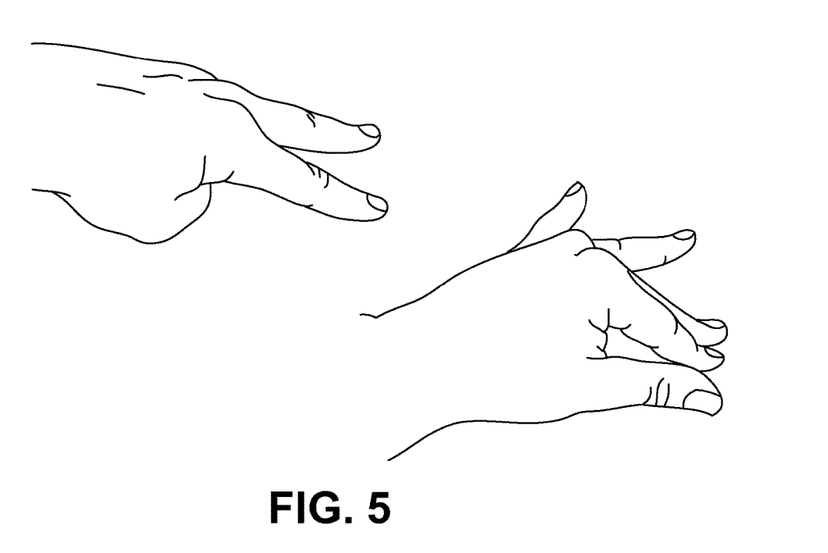
FIG. 5 shows two ways in which a user may interact with a display surface using a multi-finger gesture.

In the above example, the fingerprint detection module 110 can distinguish between different fingers in different ways. (This finger information is referred to as type information herein because this information identifies a particular finger.) In one approach, the user can register, in advance, his or her fingerprints with the computing device 100 and/or the remote computing functionality 302 of FIG. 3. Different fingers contain different telltale fingerprints. Thus, the fingerprint detection module 110 can subsequently compare detected fingerprint information with a data store of pre-stored fingerprint information to find a match, and thereby identify the finger of the user that has touched the display surface 402. Indeed, as shown in the scenarios of FIG. 5, the user can potentially interact with the display by placing two or more fingers on the display surface 402. The fingerprint detection module 110 can consult the database to determine the identity of plural fingers that the user may have placed on the display surface 402.

In a second scenario, the IBSM 108 determines that the touch input events again contain fingerprint information. But in this case, assume that the IBSM 108 determines that the fingerprint information is not as well defined as the first scenario set forth above. FIG. 4 shows an example of such substandard fingerprint information 410. This substandard fingerprint information 410 exhibits only part of a complete fingerprint. Based on this observation, the IBSM 108 can lower the level of confidence for an assessment that the user has performed an intentional input action. In addition, the IBSM 108 can infer the posture at which the user may be engaging the computing device 100 based on the degraded fingerprint information 410 (e.g., based on the angle at which the finger appears to have impinged the display surface 402). This posture information provides additional evidence regarding the intentionality of the user's actions. The IBSM 108 can also use the posture information to modify the manner in which it interacts with the user, e.g., so as to accommodate the way that the user appears to be interacting with the computing device 100.

Figure 6:
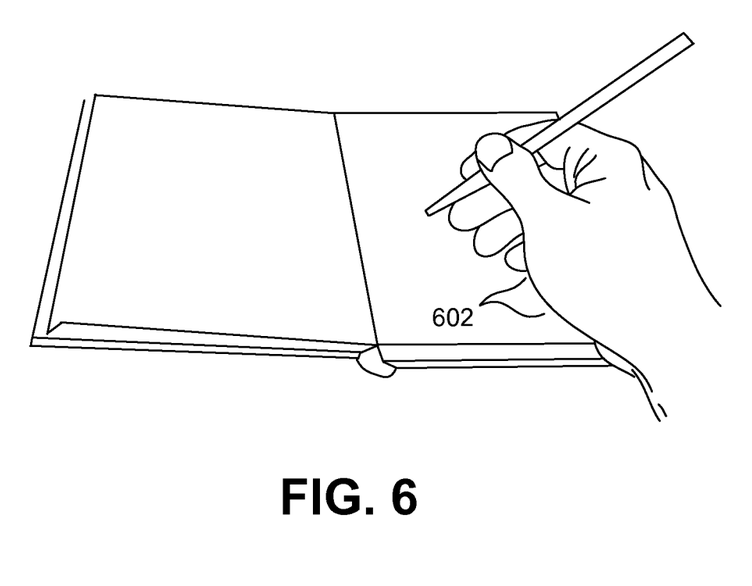
FIG. 6 shows one way in which a user may contact the display surface of a computing device with a palm of the hand, without intending to convey a gesture using the palm.

In a third scenario, the IBSM 108 determines that the touch input events lack fingerprint information, and hence, can be said to contain non-fingerprint information. The IBSM 108 can conclude from this observation that the user may have performed an unintentional input action. For example, the IBSM 108 can conclude that the user may have brushed against the display surface 402 with a palm, knuckle, side of the pinky finger, and so on. Moreover, certain parts of the hand, although not fingers, contain telltale prints, such as the palm. Hence, the IBSM 108 can strengthen its conclusion that a palm has contacted the display surface 402 by determining whether the detected information provides telltale palm print information. FIG. 6 shows a typical scenario in which a user may inadvertently rest a palm 602 and/or side of the pinky finger against a display surface.

Figure 7:
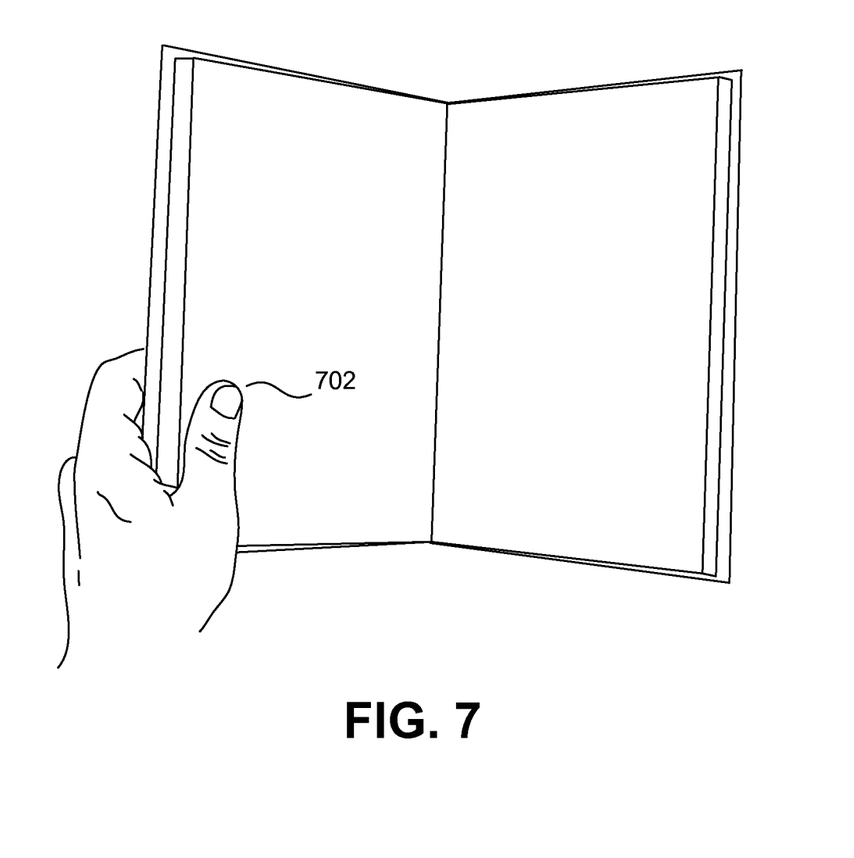
FIG. 7 shows one way in which a user may contact the display surface of a computing device with a thumb, without intending to convey a gesture using the thumb.

In a fourth scenario, the IBSM 108 determines that touch input events contain thumb fingerprint information. Based on this observation, the IBSM 108 can lower a level of confidence that the user has performed an intentional input action. This is because the user does not often make input selections using a thumb (although there are certain user interface scenarios in which it may be natural to do so.) The IBSM 108 can strengthen its conclusion based on input events received from other input mechanisms. For example, the IBSM 108 can receive input events from an accelerometer and/or gyro device which indicates that a computing device is being held in a generally upright orientation, in the manner that one commonly holds a book aloft while reading it. In this scenario, as shown in FIG. 7, the presence of the user's thumb 702 in a lower corner of the display surface is likely to be inadvertent according to one environment-specific scenario—that is, not part of an intentional touch gesture.

The IBSM 108 may encounter yet other scenarios involving the detection of fingerprint information. In each case, the IBSM 108 can leverage the fingerprint information in an attempt to determine whether the underlying input action is intentional or unintentional. The IBSM 108 can also attempt to infer any additional characteristics associated with the input events, such as the likely posture of the user during the input action.

Figure 8:
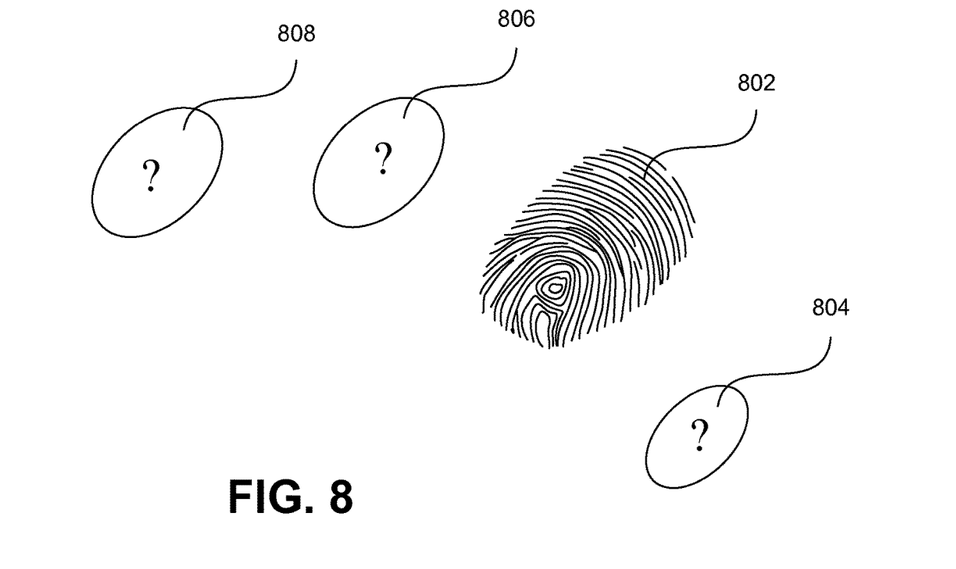
FIGS. 8 and 9 show two ways in which a computing device may use fingerprint information to help interpret unknown information.

FIGS. 8 and 9 show yet other use scenarios in which fingerprint information is used to enhance the interpretation of input actions. For example, in FIG. 8, the user has applied multiple fingers (or more generally, multiple hand portions) to a display surface and/or a pad-type input device, etc. In this case, assume that the IBSM 108 is able to determine that one touch contact 802 represents fingerprint information. Furthermore, assume that the IBSM 108 is able to identify the finger associated with the contact 802 (as well as, possibly, the person who is associated with the fingerprint information). But also assume that the IBSM 108 is not able to correlate other contacts (e.g., 804, 806, and 808) with known fingers (or known persons). Hence, the other contacts (804, 806, 808) may represent unknown "blobs." More specifically, the other contacts (804, 806, 808) may constitute non-fingerprint information according to the terminology used herein insofar as they cannot be correlated with known (or unknown) fingerprints.

In one implementation, the IBSM 108 can use the known contact 802 as a reference point to interpret the unknown contacts (804, 806, 808). For example, if the known contact 802 corresponds to the ringer finger of a right hand, then the contact 804 that is adjacent to the contact 802 may represent a pinky finger, and so on.

Figure 9:
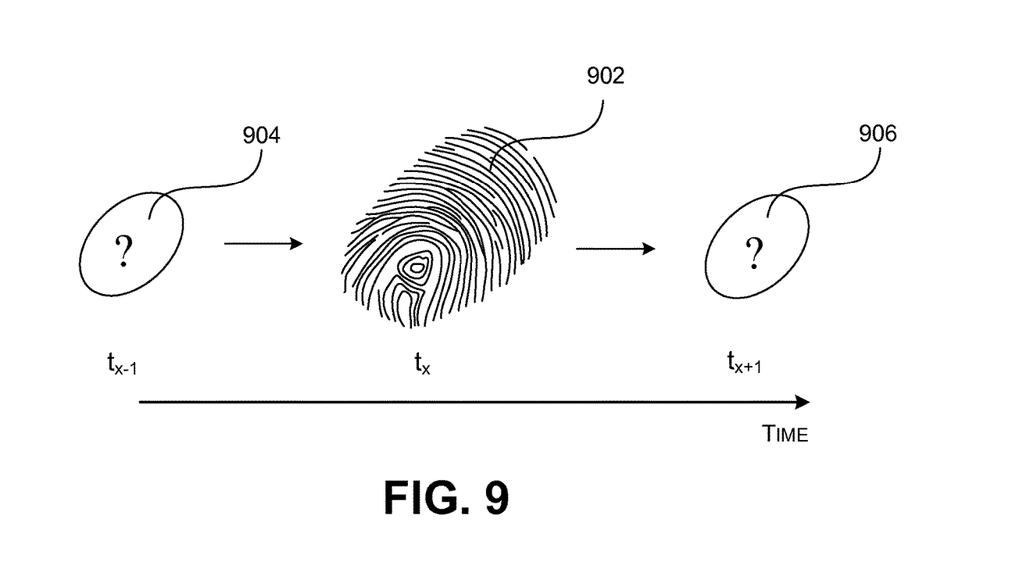

Similarly, in FIG. 9, assume that, at time $t_x$, the IBSM 108 is able to determine that a contact 902 represents fingerprint information, e.g., corresponding to a particular finger of a particular person. But prior to that point, at time $t_{x-1}$, the IBSM 108 cannot classify a contact 904 that generally occurs at the same location as contact 902. Likewise, at time $t_{x+1}$, the IBSM 108 cannot classify a contact 906 that generally occurs at the same location as contact 902. Again, the IBSM 108 can use the known contact 902 as an aid in interpreting the unknown contacts (904, 906). In this case, the IBSM 108 can conclude that all three contacts represent the same finger of the same person. This particular temporal sequence may correspond to the case in which a user applies and removes a finger on a display surface or a digitizer surface. In another case, the IBSM 108 can combine the types of analyses referenced in FIGS. 8 and 9, e.g., by using known contacts in both the temporal and/or spatial dimensions to help interpret unknown contacts.

The IBSM 108 can also create new gestures based which rely on the ability of the fingerprint detection module 110 to detect the finger (or fingers) which have contacted a display surface. For example, the computing device 100 can associate a first, second, and third commands with the index, middle, and ring fingers, respectively, of a user. The IBSM 108 can establish yet other commands for various applied combinations of these fingers. Then, when a user applies a particular finger (or fingers), the IBSM can recognize the finger(s) and execute the appropriate command behavior.

A.3. Use of Fingerprint Information to Provide a Customized User Experience

According to a second application, the IBSM 108 can use the fingerprint information to recognize the identity of a user who has touched the display surface and/or a pad-type input device. The IBSM 108 can perform this task by comparing detected fingerprint information with a local and/or remote store of fingerprint information. After detection, the IBSM 108 can then provide a user experience which is tailored to a particular user. To function as described, in one implementation, the user may register his or her fingerprints in advance in a configuration operation, e.g., through a guided configuration dialog in which the user is asked to press his or her fingers against the display surface and/or a pad-type input device, etc. A hosting system can maintain safeguards to maintain the privacy of such fingerprint information thus obtained. Alternatively, or in addition, if authorized by a user, the IBSM 108 can make reference to fingerprint information which already exists in any type of local and/or remote database (including a third-party database). For example, a company or government agency may provide this fingerprint information for its employees.

Figure 10:
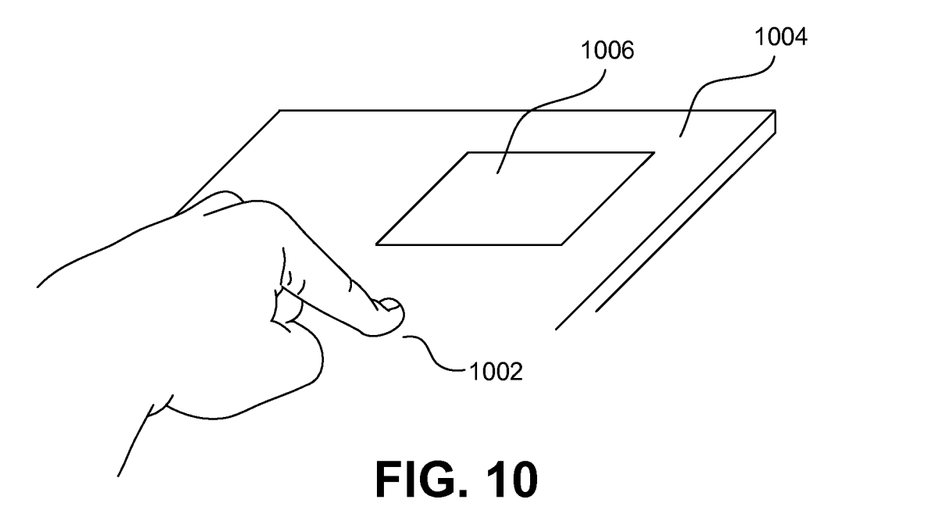
FIG. 10 shows one way in which the computing device may leverage fingerprint information by identifying a user and presenting content on the display surface that is associated with the user.

FIG. 10 illustrates one implementation of the above-described concepts. Here, a user has cleanly pressed his finger 1002 against a display surface 1004 or digitizer surface. In response, the IBSM 108 detects the fingerprint information, recognizes the user based on the fingerprint information, and then displays an object 1006 that is deemed appropriate for this user. For example, the object 1006 may correspond to a particular document, web page, menu, and so forth. If the IBSM 108 is so configured, the user may press another finger down on the display surface 1004 to receive another object. In effect, each finger of the user serves the role of a key. Instead of presenting a conventional key in a typical manner, the user simply presses his or her finger onto the display surface 1004. The user's fingerprint acts as sufficient credentials to retrieve and present content associated with the user.

In another scenario, a finger can function as a proxy that represents the corresponding user. In this context, the user can drag an object (or objects) on the display surface towards and "into" a finger placed on the display surface. The IBSM 108 interprets this action as a request to store the object(s) in a file associated with the user, or otherwise associate the object(s) with the user. The association between the user's finger and the object(s) can also be stored in the remote computing functionality 302 (of FIG. 3), e.g., in the "cloud," optionally in conjunction with the object(s) itself (and/or appropriate reference pointer(s) to the object (s)). Later, the user can again apply his or her finger to retrieve the object(s), e.g., in the manner shown in FIG. 10. The user can perform this retrieval at any site (and via any device) that is configured to read the user's fingerprint and deliver the object(s).

Figure 11:
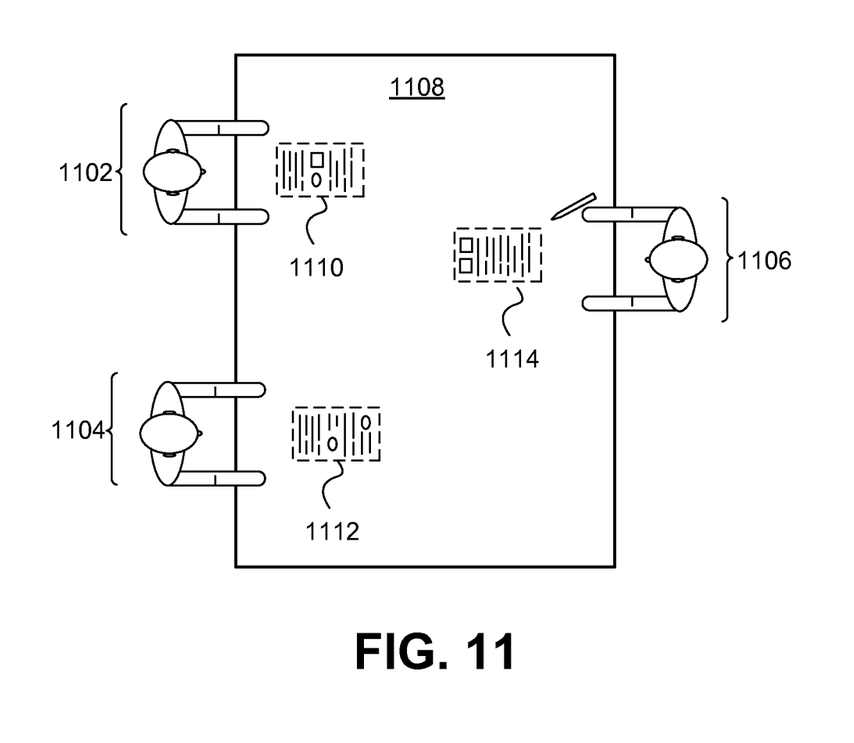
FIG. 11 shows one way in which the concepts imparted by FIG. 10 can be applied to a collaborative workspace surface environment.

FIG. 11 shows one way in which the concepts imparted by FIG. 10 can be extended to a collaborative environment. In this case, multiple participants (1102, 1104, 1106) sit around a large display surface 1108, such as a tabletop display surface, or stand in front of a large wall display, etc. In one case, the display surface 1108 is presented at a single centralized site and all participants are physically present at that site. In another case, the display surface 1108 can be virtually distributed over plural physical sites, and two or more participants may be present at two or more physical sites.

Assume that each user presses one or more fingers onto the display surface 1108. The IBSM 108 responds by detecting fingerprint information from the touch input events, and uses the fingerprint information to recognize the participants (1102, 1104, 1106). The IBSM 108 then presents objects (1110, 1112, 1114) on the display surface 1108 that are appropriate for the respective individuals. Further, object 1110 can be placed in spatial proximity to the participant 1102, object 1112 can be placed in proximity to participant 1104, and object 1114 can be placed in proximity to participant 1106. The location of a participant can be determined based on the region of the display surface 1108 at which the participant is entering input events.

B. Illustrative Processes

Figure 12:
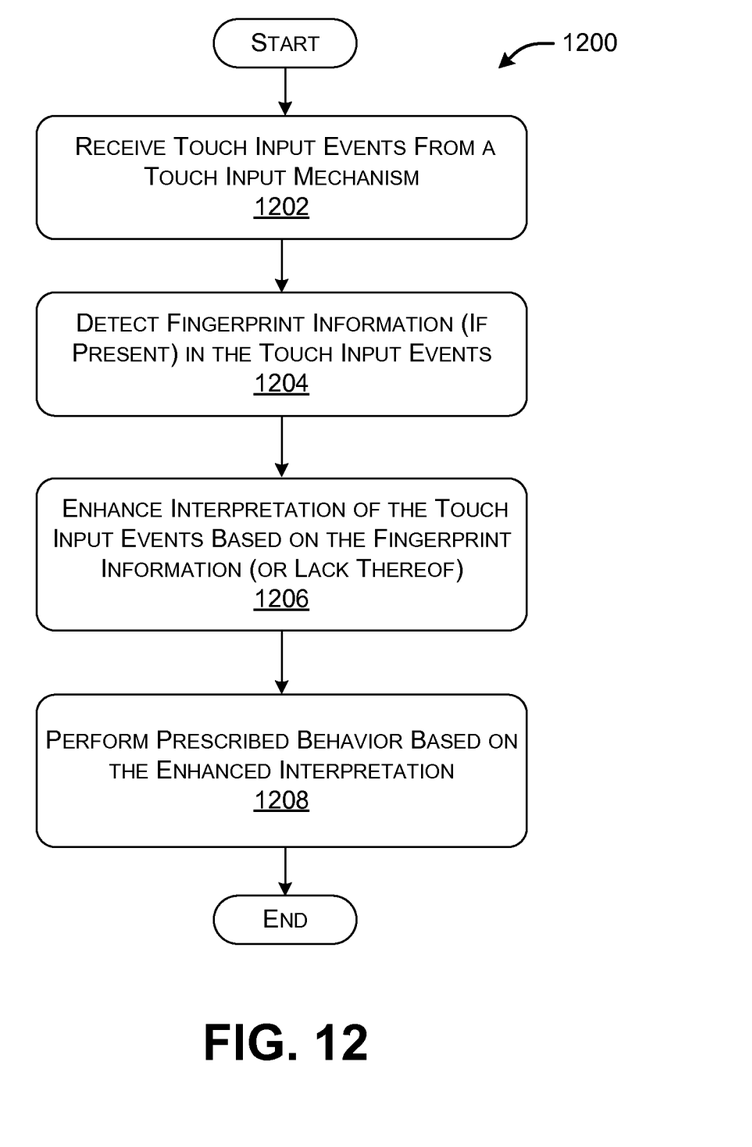
FIG. 12 shows a flowchart which sets forth the use of fingerprint information to enhance the interpretation of touch input events.
Figure 13:
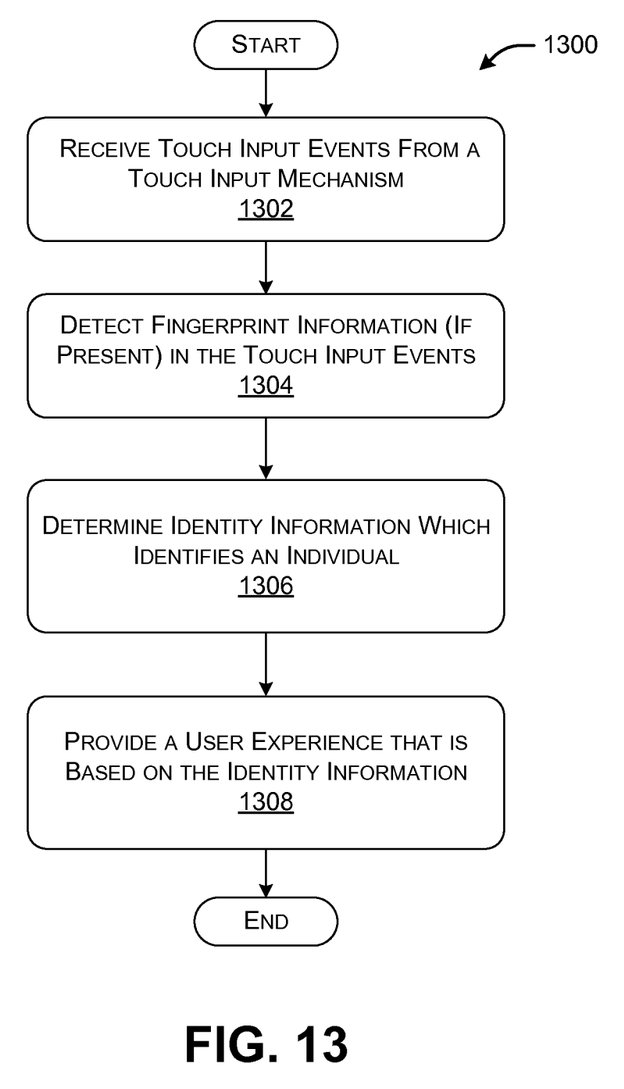
FIG. 13 shows another flowchart which sets forth the use of fingerprint information to provide a customized user experience to a user.

FIGS. 12 and 13 show procedures that illustrate one manner of operation of the computing device 100 of FIG. 1. Since the principles underlying the operation of the computing device 100 have already been described in Section A, certain operations will be addressed in summary fashion in this section.

Starting with FIG. 12, this figure shows a procedure 1200 which sets forth the use of fingerprint information to enhance the interpretation of touch input events. In block 1202, the IBSM 108 receives touch input events from the touch input mechanism 106. In block 1004, the IBSM 108 detects fingerprint information from the touch input events, or determines the absence thereof. In block 1206, the IBSM 108 uses the fingerprint information to enhance the interpretation of the touch input events. As stated, this operation may involve concluding that at least part of the touch input events represents an unintended input action. In block 1208, the IBSM 108 performs an appropriate behavior based on its interpretation of the touch input events, such as by rejecting at least part of the touch input events.

FIG. 13 shows a procedure 1300 which sets forth the use of fingerprint information to provide a customized user experience to the user. In block 1302, the IBSM 108 receives touch input events from the touch input mechanism 106. In block 1304, the IBSM 108 detects fingerprint information from the touch input events, or determines the absence thereof. In block 1306, the IBSM 108 determines identity information which identifies an individual associated with the fingerprint information. In block 1308, the IBSM 108 provides a user experience that is customized based on the identity information.

C. Representative Processing Functionality

FIG. 14 sets forth illustrative electrical data processing functionality 1400 that can be used to implement any aspect of the functions described above. With reference to FIG. 1, for instance, the type of processing functionality 1400 shown in FIG. 14 can be used to implement any aspect of the computing device 100. In one case, the processing functionality 1400 may correspond to any type of computing device that includes one or more processing devices. In all cases, the electrical data processing functionality 1400 represents one or more physical and tangible processing mechanisms.

The processing functionality 1400 can include volatile and non-volatile memory, such as RAM 1402 and ROM 1404, as well as one or more processing devices 1406. The processing functionality 1400 also optionally includes various media devices 1408, such as a hard disk module, an optical disk module, and so forth. The processing functionality 1400 can perform various operations identified above when the processing device(s) 1406 executes instructions that are maintained by memory (e.g., RAM 1402, ROM 1404, or elsewhere).

More generally, instructions and other information can be stored on any computer readable medium 1410, including, but not limited to, static memory storage devices, magnetic storage devices, optical storage devices, and so on. The term computer readable medium also encompasses plural storage devices. In all cases, the computer readable medium 1410 represents some form of physical and tangible entity.

The processing functionality 1400 also includes an input/output module 1412 for receiving various inputs from a user (via input mechanisms 1414), and for providing various outputs to the user (via output modules). One particular output mechanism may include a display mechanism 1416 and an associated graphical user interface (GUI) 1418. The processing functionality 1400 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area network, a wide area network (e.g., the Internet), etc., or any combination thereof. The communication conduit(s) 1422 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving a first touch event from a first participant and a second touch event from a second participant via a display surface of the display, wherein the display is coupled to a remote computing functionality via a network and wherein the remote computing functionality is configured to store shared work space information in a data store associated with the remote computing functionality to support collaborative tasks performed by participants in an interaction session, and wherein the display is configured to download applications provided by the remote computing functionality;
    interpreting the first touch event from the first participant in the interaction session as a request to drag a first object displayed on the display surface and in response to the request, associating the first object with the first participant using logic associated with the display surface;

interpreting the second touch event from the second participant in the interaction session as a request to select a menu option displayed on the display surface and in response to the request generating at least one touch event using the logic associated with the display surface;

interpreting a third touch event from a third participant in the interaction session as a request to display a web page on the display surface and displaying the web page on the display surface using the logic associated with the display surface;

receiving a first request from a fourth participant in the interaction session, not via the display surface of the display, but from a user device, different from the display, associated with the fourth participant and in response to the request displaying a second object on the display surface using the logic associated with the display surface, wherein the second object is associated with user content located in the data store associated with the remote computing functionality;

receiving a second request from a fifth participant in the interaction session, not via the display surface of the display, but from a user device, different from the display, associated with the fifth participant and in response to the request executing an application on the display surface using the logic associated with the display surface; and storing information related to the interaction session in the data store associated with the remote computing functionality to support any collaborative tasks performed by participants in the interaction session.

2. The method of claim 1, wherein the remote computing functionality is coupled to the display via at least one network.

3. The method of claim 1, wherein the remote computing functionality is implemented using at least one server computer.

4. The method of claim 1, wherein:
associating the first object with the first participant includes storing an indication of the association in conjunction with the first object.

5. The method of claim 4 further comprising:
retrieving the first object in response to receipt of a touch of a finger by the first participant, at a temporal time that is later than the storing of the indication of the association in conjunction with the first object.

6. The method of claim 5, wherein:
the retrieving the first object includes retrieving the first object in response to receipt of a touch of the finger by the first participant on a second display surface, that is different from the display surface, at a temporal time that is later than the storing of the indication of the association in conjunction with the first object.

7. A device comprising:
a display having a display surface;
logic configured to detect touch events received via the display surface;
logic configured to receive a first touch event from a first participant and a second touch event from a second participant via the display surface, wherein the display is coupled to a remote computing functionality via a network and wherein the remote computing functionality is configured to store shared work space information in a data store associated with the remote computing functionality to support collaborative tasks performed by participants in an interaction session, and wherein the logic is configured to download applications provided by the remote computing functionality;

logic configured to interpret the first touch event from the first participant in the interaction session as a request to drag a first object displayed on the display surface and in response to the request associate the first object with the first participant;

logic configured to interpret the second touch event from the second participant in the interaction session as a request to select a menu option displayed on the display surface and in response to the request generate at least one touch event;

logic configured to interpret a third touch event from a third participant in the interaction session as a request to display a web page on the display surface and display the web page on the display surface;

logic configured to receive a first request from a fourth participant in the interaction session, not via the display surface of the display, but from a user device, different from the display, associated with the fourth participant and in response to the request display a second object on the display surface, wherein the second object is associated with user content located in the data store associated with the remote computing functionality;

logic configured to receive a second request from a fifth participant in the interaction session, not via the display surface of the display, but from a user device, different from the display, associated with the fifth participant and in response to the request execute an application on the display surface; and logic configured to store information related to the interaction session in the data store associated with the remote computing functionality to support any collaborative tasks performed by participants in the interaction session.

8. The device of claim 7, wherein the remote computing functionality is coupled to the display via at least one network.

9. The device of claim 7 further comprising logic configured to, by analyzing the first fingerprint information, determine a posture of the first recognized participant.

10. The device of claim 7, wherein:
the logic configured to associate the first object with the first participant includes logic configured to store an indication of the association in conjunction with the first object.

11. The device of claim 10 further comprising:
logic configured to retrieve the first object in response to receipt of a touch of a finger by the first participant, at a temporal time that is later than storing of the indication of the association in conjunction with the first object.

12. The device of claim 11, wherein:
the logic configured to retrieve the first object includes logic configured to retrieve the first object in response to receipt of a touch of the finger by the first participant on a second display surface, that is different from the display surface, at a temporal time that is later than the storing of the indication of the association in conjunction with the first object.

13. A device comprising:
a display having a display surface;
logic configured to detect touch events received via the display surface;
logic configured to receive a first touch event from a first participant and a second touch event from a second participant via the display surface, wherein the display is coupled to a remote computing functionality via a network and wherein the remote computing functionality is configured to store shared work space information in a data store associated with the remote computing functionality to support collaborative tasks performed by participants in an interaction session, and wherein the logic is configured to download applications provided by the remote computing functionality;

logic configured to interpret the first touch event using fingerprint information based on any first fingerprint information present in the first touch event, and using at least the first fingerprint information to recognize the first participant as a first recognized participant;

logic configured to interpret the second touch event using fingerprint information based on any second fingerprint information present in the second touch event, and using at least the second fingerprint information to recognize the second participant as a second recognized participant, wherein the second fingerprint information is different from the first fingerprint information;

logic configured to determine a first location of the first recognized participant based on a first region of the display surface corresponding to the first touch event and determine a second location of the second recognized participant based on a second region of the display surface corresponding to the second touch event, and present a first object in spatial proximity to the first recognized participant based on the first location and present a second object in spatial proximity to the second recognized participant based on the second location;

logic configured to interpret a third touch event from a third participant in the interaction session as a request to display a web page on the display surface and display the web page on the display surface;

logic configured to receive a first request from a fourth participant in the interaction session, not via the display surface of the display, but from a user device, different from the display, associated with the fourth participant and in response to the request display a third object on the display surface, wherein the third object is associated with user content located in the data store associated with the remote computing functionality;

logic configured to receive a second request from a fifth participant in the interaction session, not via the display surface of the display, but from a user device, different from the display, associated with the fifth participant and in response to the request execute an application on the display surface; and logic configured to store information related to the interaction session in the data store associated with the remote computing functionality to support any collaborative tasks performed by participants in the interaction session.

14. The device of claim 13 further comprising:

logic configured to, by analyzing the first fingerprint information, determine a posture of the first recognized participant; and logic configured to execute a command based on whether the first touch event corresponds to an index finger, a middle finger, or a ring finger of the first recognized participant.

15. The device of claim 13 further comprising:

logic configured to receive a first input indicating a user initiated drag of the first object on the display surface; and logic configured to associate the first object with the first recognized participant, wherein the logic configured to associate the first object with the first recognized participant includes logic configured to store an indication of the association in conjunction with the first object.

16. The device of claim 15 further comprising:

logic configured to retrieve the first object in response to receipt of a touch of a finger by the first recognized participant, at a temporal time that is later than storing of the indication of the association in conjunction with the first object.

* * * * *